(12) United States Patent
Goenner et al.

(10) Patent No.: US 10,928,529 B2
(45) Date of Patent: Feb. 23, 2021

(54) HERMETICALLY SEALED HYDROPHONES WITH A VERY LOW ACCELERATION SENSITIVITY

(71) Applicant: Amphenol (Maryland), Inc., Germantown, MD (US)

(72) Inventors: Matthew C. Goenner, Rockville, MD (US); Mihaela Marin, Rockville, MD (US)

(73) Assignee: Amphenol (Maryland), Inc., Germantown, MD (US)

(*) Notice: Subject to any disclaimer, the term of this patent is extended or adjusted under 35 U.S.C. 154(b) by 371 days.

(21) Appl. No.: 16/012,250

(22) Filed: Jun. 19, 2018

(65) Prior Publication Data
US 2018/0329094 A1 Nov. 15, 2018

Related U.S. Application Data

(63) Continuation of application No. 14/977,059, filed on Dec. 21, 2015, now Pat. No. 10,001,574.

(60) Provisional application No. 62/255,888, filed on Nov. 16, 2015, provisional application No. 62/119,842, filed on Feb. 24, 2015, provisional application No. 62/120,037, filed on Feb. 24, 2015.

(51) Int. Cl.
*G01V 1/00* (2006.01)
*G01V 1/18* (2006.01)
*B06B 1/06* (2006.01)

(52) U.S. Cl.
CPC .............. *G01V 1/188* (2013.01); *B06B 1/06* (2013.01)

(58) Field of Classification Search
USPC ......................................................... 367/157
See application file for complete search history.

(56) References Cited

U.S. PATENT DOCUMENTS

| 2,272,984 A | 2/1942 | Ritzmann |
| 3,187,300 A | 6/1965 | Brate |

(Continued)

FOREIGN PATENT DOCUMENTS

| CA | 1065046 A | 10/1979 |
| EP | 0678924 A1 | 10/1995 |
| FR | 2517155 A1 | 5/1983 |

OTHER PUBLICATIONS

European Search Report for EP Application No. 16199044.5, dated May 19, 2017, 9 pages.

(Continued)

*Primary Examiner* — James R Hulka
(74) *Attorney, Agent, or Firm* — Blank Rome LLP

(57) ABSTRACT

An improved hydrophone is presented that has extremely low acceleration sensitivity, hermetic sealing, and is self-shielded. The hydrophone can also contain an integral amplifier and pressure/depth limiting switch. The hydrophone is also designed such that it can use a single standard piezoelectric sensing element in many hydrophone designs that have different acoustic pressure sensitivities but the same capacitance. Lastly, the sensor is also designed to be low cost in high volumes using standard accelerometer manufacturing techniques. A hydrophone is also designed such that it can use a single standard piezoelectric sensing element that can be incorporated into several hydrophone configurations with varying acoustic pressure sensitivities. The sensor is also designed to be low cost in high volumes.

6 Claims, 14 Drawing Sheets

(56) References Cited

U.S. PATENT DOCUMENTS

| | | | |
|---|---|---|---|
| 3,660,809 A | 5/1972 | Pearson | |
| 3,721,953 A | 3/1973 | Bennett | |
| 3,832,762 A | 9/1974 | Johnston et al. | |
| 3,970,878 A | 7/1976 | Berglund | |
| 4,015,233 A | 3/1977 | Laurent et al. | |
| 4,017,824 A | 4/1977 | Fife et al. | |
| 4,162,476 A | 7/1979 | Fanning | |
| 4,208,737 A | 6/1980 | Thompson et al. | |
| 4,517,664 A | 5/1985 | Berglund | |
| 4,535,205 A | 8/1985 | Ravinet et al. | |
| 4,653,036 A | 3/1987 | Harris et al. | |
| 4,679,178 A | 7/1987 | Larsen et al. | |
| 5,036,945 A | 8/1991 | Hoyle et al. | |
| 5,339,290 A * | 8/1994 | Greenstein | B06B 1/0688 |
| | | | 310/324 |
| 5,357,486 A | 10/1994 | Pearce | |
| 5,432,396 A | 7/1995 | Sato et al. | |
| 5,663,931 A | 9/1997 | Erath | |
| 5,774,423 A | 6/1998 | Pearce et al. | |
| 5,982,708 A | 11/1999 | Pearce | |
| 6,108,274 A | 8/2000 | Pearce | |
| 6,275,448 B1 | 8/2001 | Kittower et al. | |
| 6,279,395 B1 | 8/2001 | Insalaco et al. | |
| 6,617,765 B1 * | 9/2003 | Lagier | G10K 9/122 |
| | | | 310/322 |
| 7,570,543 B2 | 8/2009 | Ferguson | |
| 9,784,861 B2 | 10/2017 | Fernihough | |
| 10,001,574 B2 * | 6/2018 | Goenner | G01V 1/188 |
| 2003/0058741 A1 | 3/2003 | Franklin | |
| 2007/0064527 A1 | 3/2007 | Ferguson | |
| 2007/0230721 A1 | 10/2007 | White et al. | |
| 2008/0080318 A1 | 4/2008 | Maxwell et al. | |
| 2015/0219776 A1 | 8/2015 | Fernihough | |
| 2017/0031040 A1 * | 2/2017 | Goenner | B06B 1/06 |
| 2017/0173262 A1 * | 6/2017 | Veltz | A61B 5/0022 |

OTHER PUBLICATIONS

Edward T. O'Neil, "Hydrophone Development at Hudson Laboratories", Sep. 24, 1963, Technical Report No. 105, pp. 1-68.
Miguel Alvarado Juarez "Construction and Testing of Low-Noise Hydrophones" Naval Post Graduate School, pp. 1-47, 2003.

* cited by examiner

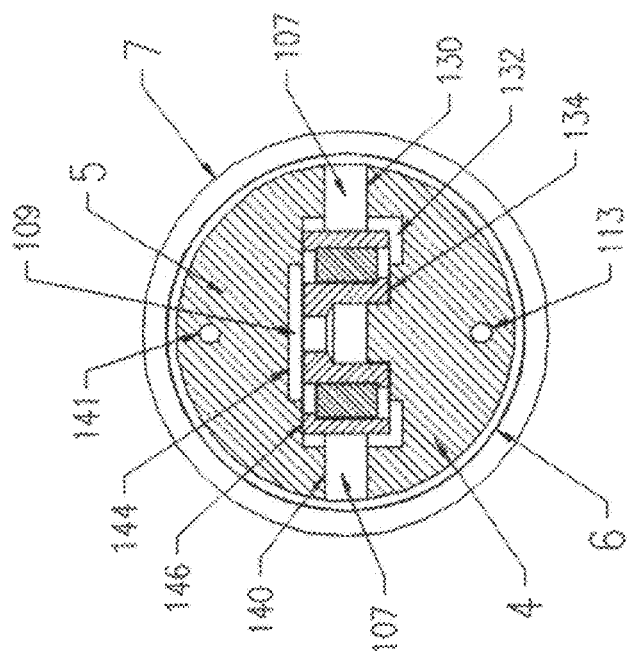
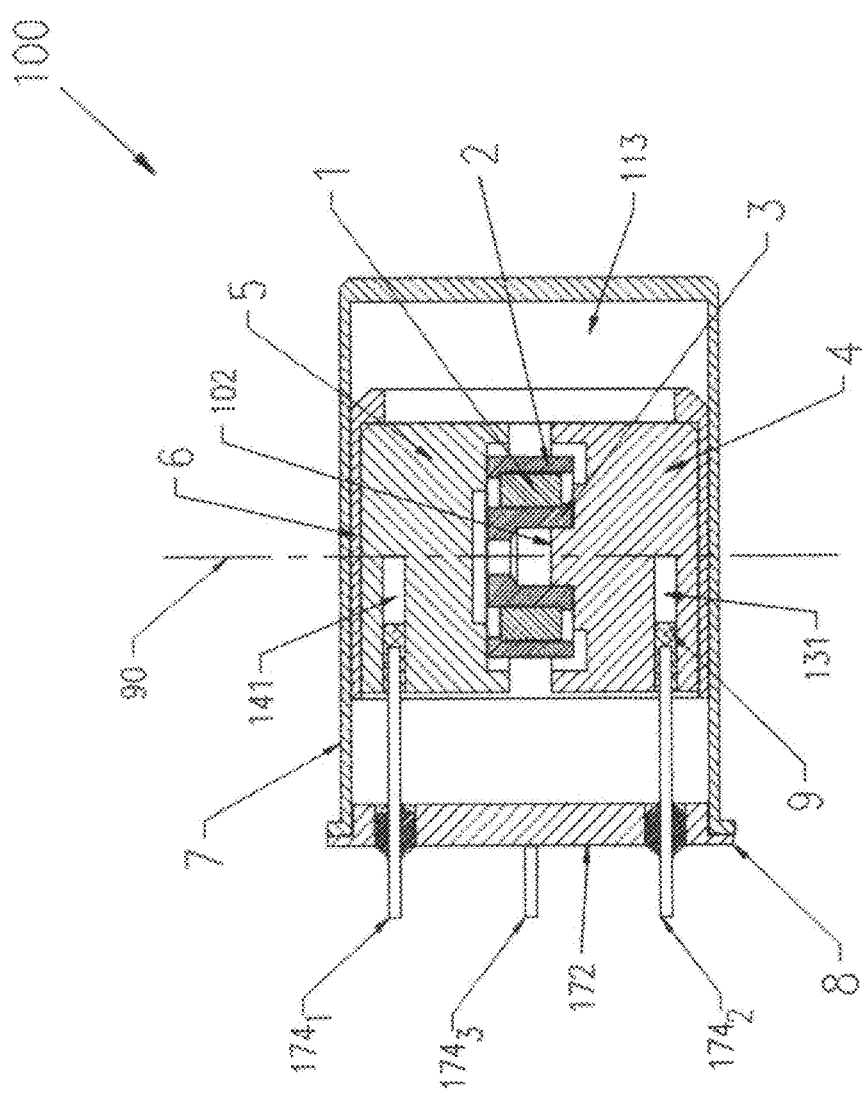
FIGURE 1A
FIGURE 1B

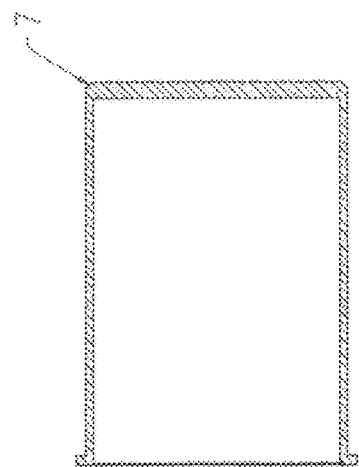
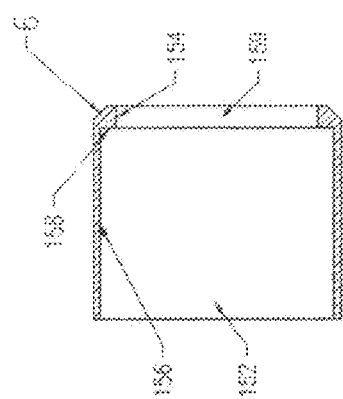
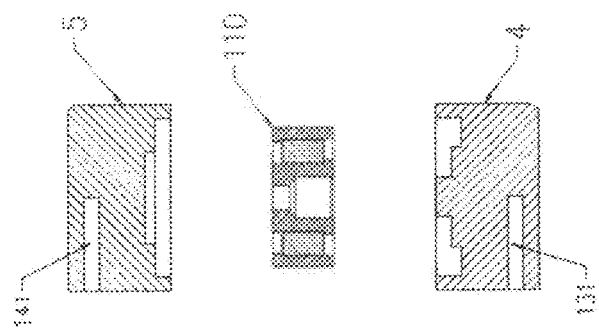
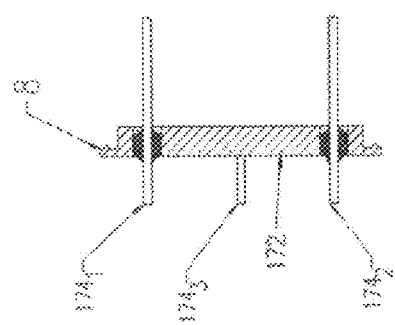
FIGURE 3

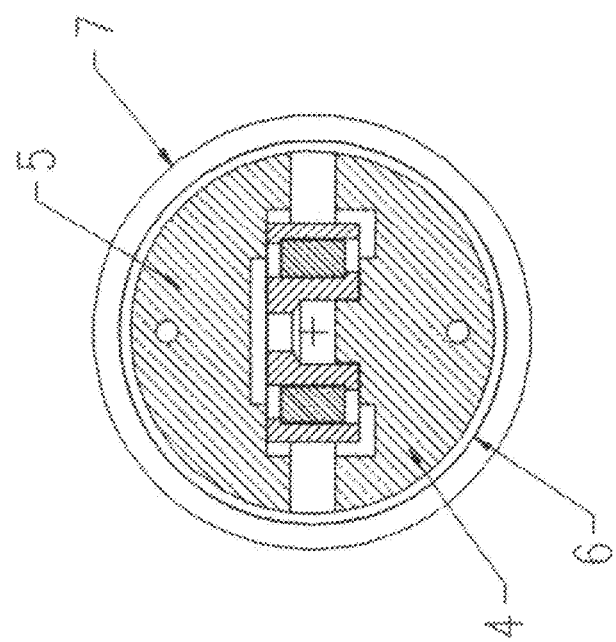
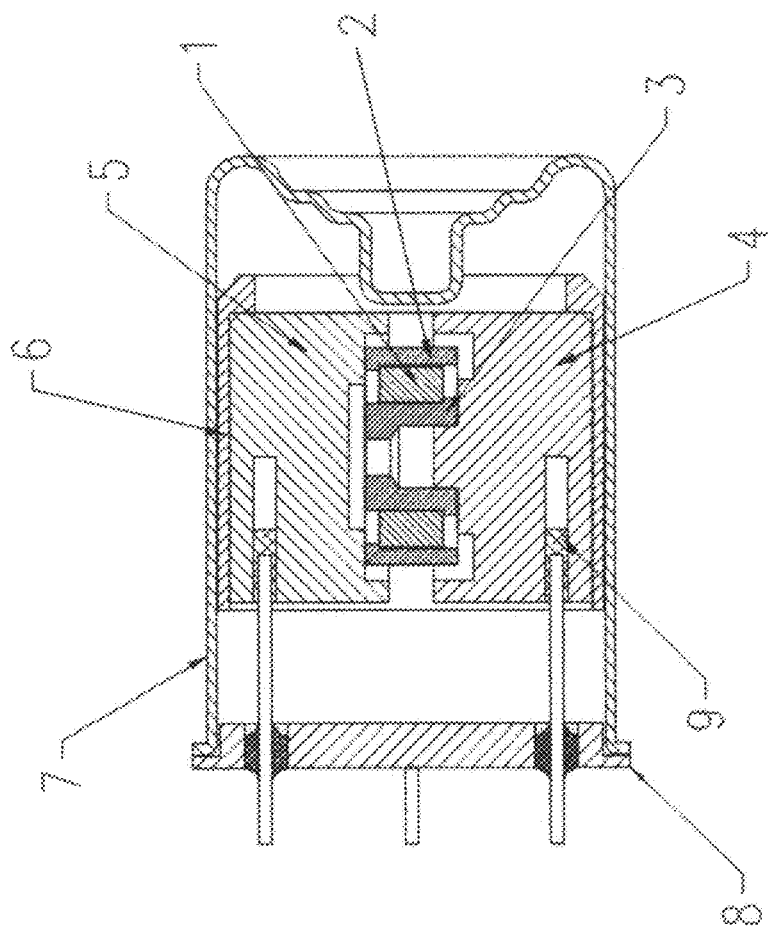
FIGURE 5A
FIGURE 5B

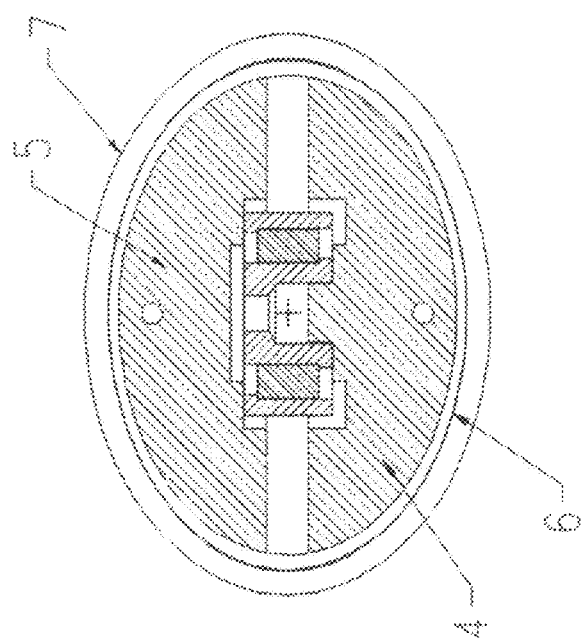
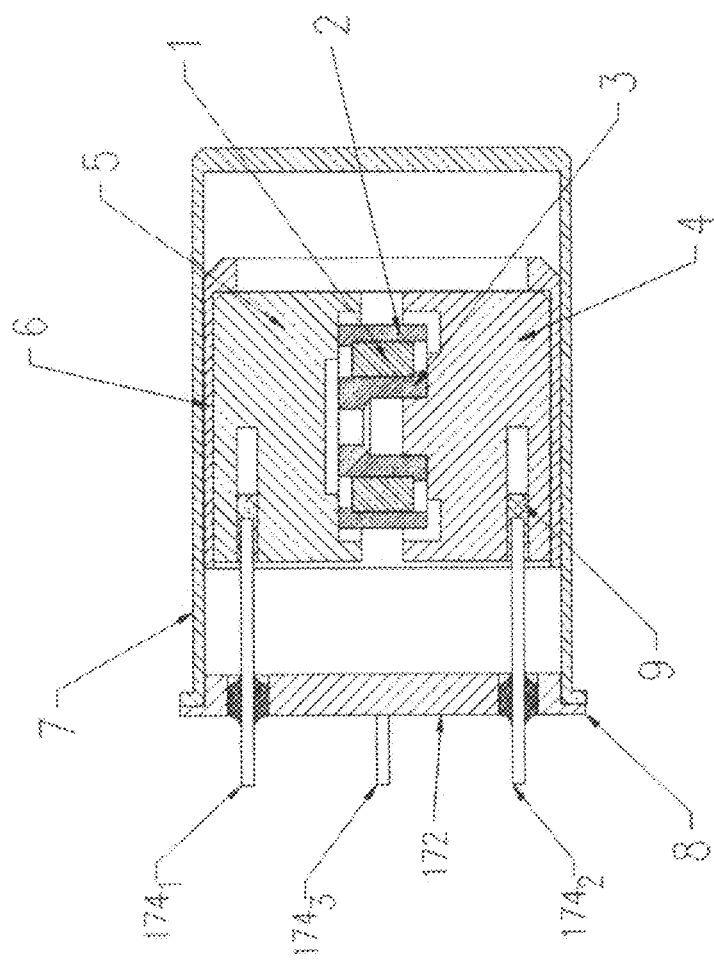
FIGURE 8A
FIGURE 8B

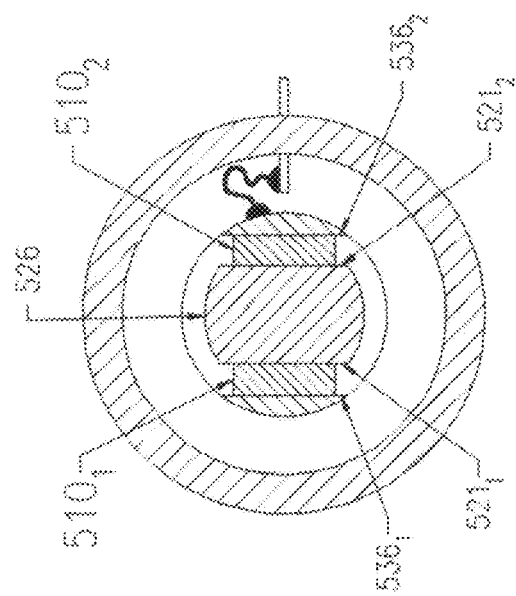
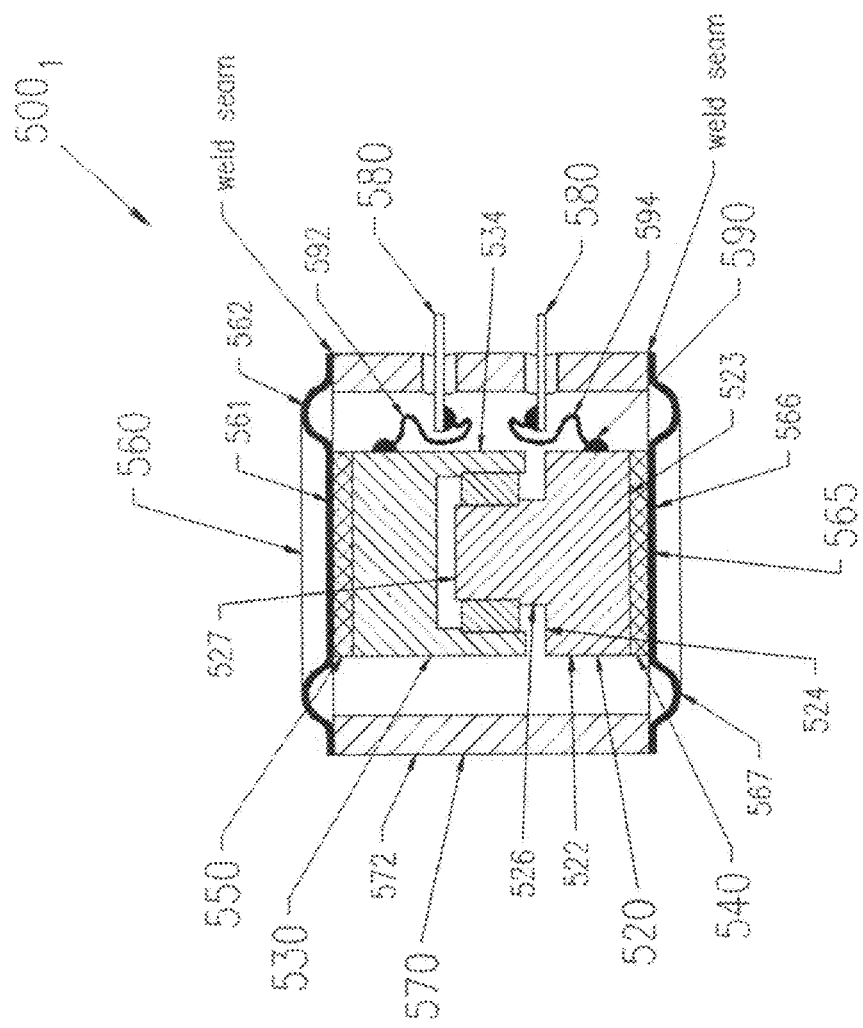

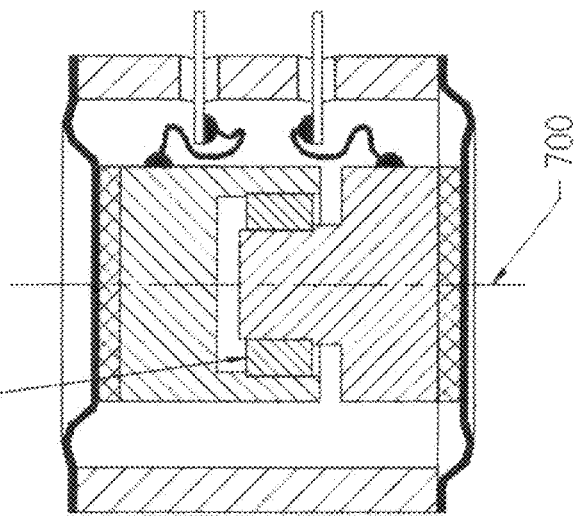
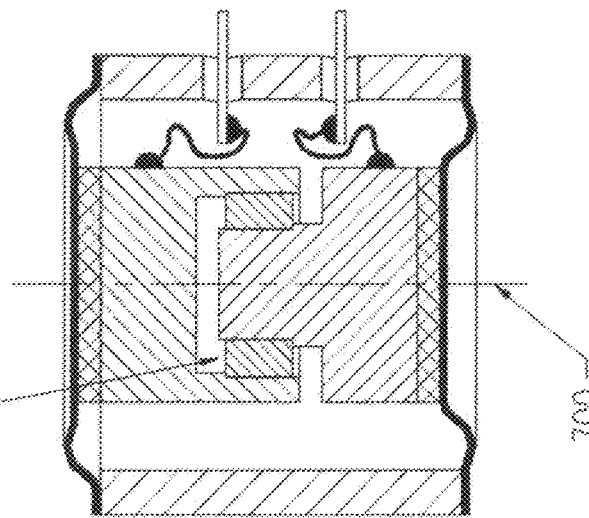
FIGURE 13B

HERMETICALLY SEALED HYDROPHONES WITH A VERY LOW ACCELERATION SENSITIVITY

RELATED APPLICATIONS

This application is a continuation of U.S. application Ser. No. 14/977,059, filed Dec. 21, 2015, now U.S. patent Ser. No. 10/001,574, which claims the benefit of U.S. Provisional Application No. 62/255,888, filed Nov. 16, 2015, and Provisional Application Nos. 62/120,037 and 62/119,842, both of which were filed on Feb. 24, 2015. The entire contents of those applications are incorporated herein by reference.

BACKGROUND OF THE INVENTION

Field of the Invention

The present invention is directed to a hydrophone that is utilized in underwater towed arrays, stationary arrays, and other sensing systems both mobile and stationary. More particularly, the invention relates to axial and radial hydrophones with very low acceleration sensitivity.

Description of the Related Art

The designs of most hydrophones for towed arrays, stationary arrays, and underwater sensing systems have been driven by cost and assumptions about the environment in which they will be operating. The need for low cost has resulted in a hydrophone which is lacking in many regards including high acceleration sensitivity, non-hermetic sealing, no shielding, and no amplification circuitry.

Existing hydrophones used in underwater applications are typically cylinders of piezoelectric material that respond to an acoustic pressure wave to generate an electrical output. However, those hydrophones also respond to acceleration which generates unwanted electrical signals that contaminate the electrical signals generated by the acoustic pressure wave. To cancel out the effects of the unwanted electrical signals due to acceleration, some hydrophones have been constructed using two piezoelectric elements wired in such a way as to reduce or eliminate the acceleration signal while not affecting the signal generated by the acoustic pressure. However for this technique to work the two piezoelectric elements have to be almost identical in their piezoelectric composition, the mass of each opposing element, and the attachment of the two opposing elements. This approach is tedious and time consuming and results in a very labor intensive and expensive hydrophone. (See Hydrophone Development at Hudson Laboratories, Edward T. O'Neill, Ad 437903, Defense Documentation Center for Scientific and Technical Information, Alexandria Va., Sep. 24, 1963, FIG. 1 and pages 14-18).

Existing hydrophones for towed arrays, stationary arrays, and underwater systems are not designed to be submerged in sea water but rather a fill fluid that is nonconductive. However it has been observed over time that sea water can seep into an array or underwater system and come in contact with and permeate the hydrophone. The seawater can cause an outright electrical short or can degrade the performance of the hydrophone over time. This causes the operator of the towed array or underwater system to question the validity of the measurements from the hydrophone and sometimes requires the operator to conduct a lengthy calibration to validate the towed array or underwater systems performance.

Existing hydrophones for towed arrays, stationary arrays, and underwater systems are not designed with a built-in shield. Instead, the electrical shielding is provided by a shield cloth or shield layer when installed in the array or system. The necessity of including shield cloth for the hydrophone adds complexity and cost to the array or underwater system.

Most hydrophones in towed arrays, stationary arrays, and underwater systems are provided with no internal amplification circuitry. Historically a telemetry provider would have built in signal conditioning and amplification circuitry to accommodate the hydrophone. However, the lack of circuitry in the hydrophone requires the capacitance of the hydrophone to be high and the cable length to be short so that the capacitance of the cable is small compared to the capacitance of the hydrophone. If this parasitic cable capacitance is not small compared to the hydrophone capacitance, then the performance of the hydrophone is degraded. The cable capacitance issue significantly limits the design of the hydrophone and the configuration of underwater systems using a hydrophone. (See Hydrophone Development at Hudson Laboratories, page 4).

Existing hydrophones used in underwater applications typically use a piezoelectric sensing element that is cylindrical in design and poled in the compression mode in the radial direction of the cylinder; such that when an acoustic pressure wave is incident upon the cylinder it compresses or squeezes the cylinder, causing an electrical signal to be produced. These hydrophones are sometimes called end cap cylinder hydrophones because they have a hard cap attached to one or both ends. In any case, once the piezoelectric cylinder is fabricated from a specific piezoelectric material and poled, its electrical output due to an incident acoustic pressure and its capacitance are set. (See Hydrophone Development at Hudson Laboratories, FIG. 1).

If one wanted to increase the pressure sensitivity output of an existing piezoelectric cylinder one would have to add an amplifier. (See Hydrophone Development at Hudson Laboratories, pages 35-39). Another option to increase the pressure sensitivity of an existing piezoelectric cylinder would be to add multiple cylinders together to make a composite hydrophone. Hydrophones are capacitors so electrically they add inversely when combined in series and add directly when combined in parallel. Therefore, if two identical hydrophones were wired together in parallel they would have twice the capacitance but the pressure sensitivity would not change. On the other hand, if two identical hydrophones were wired together in series they would have double the pressure sensitivity but half the capacitance. In many cases the signal conditioning circuitry that the hydrophones are attached to is optimized for a specific capacitance range so reducing the capacitance by a factor of two is generally not acceptable.

Also, as mentioned above, the lower the hydrophone capacitance becomes the more relevant the parasitic cable capacitance becomes. Because of these issues, most hydrophones are added together in series-parallel combinations that increase the pressure sensitivity to the desired level while keeping the capacitance very near the value of a single hydrophone. Therefore to increase the pressure sensitivity by a factor of two while keeping the capacitance the same, one would have to use four identical hydrophones where one pair of hydrophones wired in parallel is added in series with another pair of hydrophones wired in parallel. The resulting composite hydrophone would have the same diameter as a single hydrophone but would be at least 4 times the length of a single hydrophone. This approach is cumbersome and requires significant wiring and hydrophone paring to ensure that the final combination of hydrophones results in the desired capacitance and pressure sensitivity.

Many hydrophones incorporate a mechanical switch which activates at a specific static pressure or water depth to short the electrical output of the hydrophone. The mechanical switch is not an integral part of the hydrophone but rather an added component. The switch is typically a mechanical surface, in most cases a dome, which will be depressed at a specific static pressure. The dome makes contact with another electrical surface on a circuit board that is connected to the leads of the hydrophone. When contact is made on the circuit board the hydrophone output is shorted. This short will disable the hydrophone such that it will not produce an electrical signal in response to an acoustic pressure wave. In some cases this switch can be damaged or deformed if the static pressure applied to the outer portion of the switch is in excess of the design pressure. In this case the mechanical switch will not operate as it did previously and may short the hydrophone at a different depth or permanently short the hydrophone. Lastly, adding a separate mechanical switch to the hydrophone adds cost and complexity and can sometimes lead to improper operation.

Some traditional hydrophones have an atmospheric pressure compensation feature where the center of the cylinder is filled with fluid and is connected to the exterior pressure by a flexible bulb. As the static pressure increases on the hydrophone, the bulb depresses and the pressure is equalized on both sides of the cylinder thereby preventing it from generating a voltage from an unbalanced force on the cylinder and, in some cases, preventing the hydrophone from being crushed. This provides the hydrophone with a stable acoustic pressure response at all depths. (See Hydrophone Development at Hudson Laboratories, pages 6-14).

SUMMARY OF THE INVENTION

One purpose of the invention is to provide a novel scheme for an improved hydrophone that has extremely low acceleration sensitivity, hermetic sealing, and is self-shielded. The hydrophone can also contain an integral amplifier and pressure/depth limiting switch. The hydrophone is also designed such that it can use a single standard piezoelectric sensing element in many hydrophone designs that have different acoustic pressure sensitivities but the same capacitance. Another purpose of the invention is to provide a novel scheme for an improved hydrophone that has extremely low acceleration sensitivity, hermetic sealing, and self-shielding. In addition, it is an object of the invention to provide a sensor that is designed to be low cost in high volumes using standard accelerometer manufacturing techniques.

BRIEF DESCRIPTION OF THE DRAWINGS

FIG. 1A is a cross-sectional side view of a radial hydrophone;

FIG. 1B is a cross-sectional end view of the hydrophone of FIG. 1A;

FIG. 3 is an exploded view of the radial hydrophone;

FIG. 5A is a cross-sectional side view of a radial hydrophone with a pressure switch;

FIG. 5B is a cross-sectional end view of the hydrophone of FIG. 5A;

FIG. 8A is a cross-sectional side view of a radial hydrophone with an elliptical support shoe;

FIG. 8B is a cross-sectional end view of the hydrophone of FIG. 8A;

FIG. 11A is a cross-sectional side view of an axial hydrophone with two plane shear crystals;

FIG. 11B is a cross-sectional top view of the axial hydrophone of FIG. 11A;

FIG. 13B shows the axial hydrophone with acceleration excitation in the axial direction.

DETAILED DESCRIPTION OF THE INVENTION

Figure 2A:
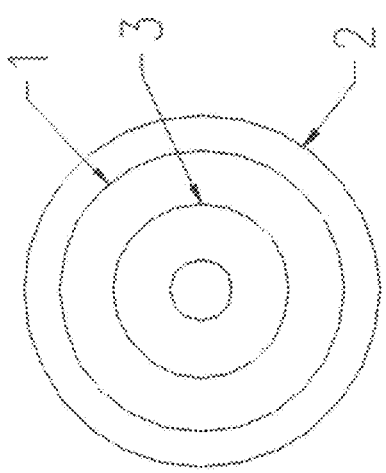
FIG. 2A is a top view of an annular shear sensing element.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

Turning to the drawings, a hydrophone is provided that is sensitive to very low acceleration. FIGS. 1-9 illustrate a radial hydrophone 100 in accordance with one embodiment of the invention. The radial hydrophone 100 has a sensing surface that is the outer diameter of the cylinder. And FIGS. 10-13 illustrate axial hydrophones 500, 600 in accordance with another embodiment of the invention. The axial hydrophones 500, 600 have a sensing surface that is the ends of the cylinder. Thus, the radial and axial refers to the orientation of the pressure sensing surface of the hydrophone.

Radial Hydrophone (FIGS. 1-9)

FIGS. 1A and 1B show an embodiment of the radial hydrophone 100 in accordance with the invention. The hydrophone 100 has a sensor such as a piezoelectric crystal ring 1, an outer crystal support 2, an inner crystal support 3, an inner support shoe 4, an outer support shoe 5, and electrical isolator 6, an outer case 7 (with or without pressure switch feature ("A")), a header 8 with three electrical feedthroughs, and conductive epoxy 9.

Figure 2B:
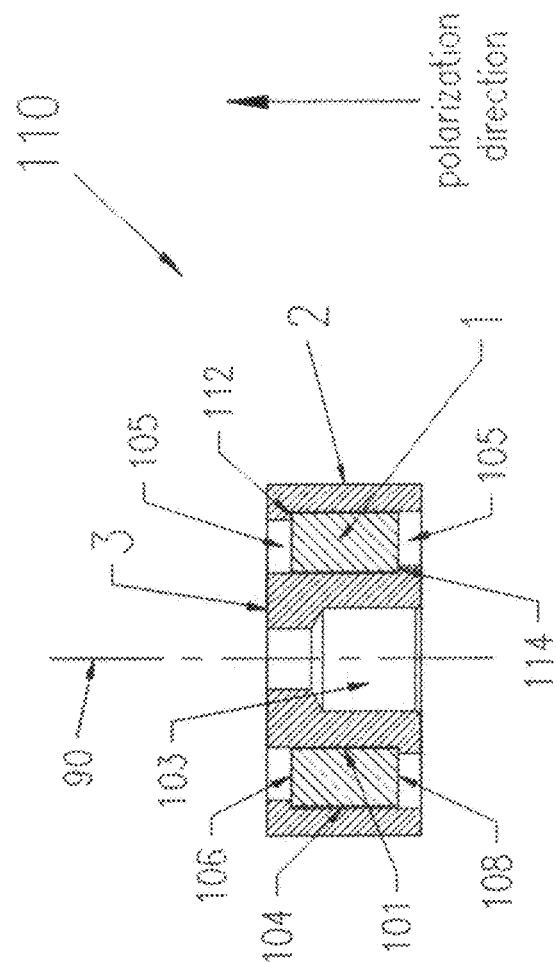
FIG. 2B is a cross-sectional side view of the sensing element of FIG. 2A.

Referring to FIGS. 2A, 2B, the piezoelectric crystal ring 1 is cylindrical and is polarized in the shear mode. The crystal 1 has a top surface 106, a bottom surface 108, and an inner cylindrical surface 101 concentric with an outer cylindrical surface 104. The crystal 1 is concentrically arranged between the outer crystal support 2 and the inner crystal support 3. Its outer cylindrical surface 104 epoxied or soldered to the inner cylindrical surface of the outer support 2, and its inner cylindrical surface 101 epoxied or soldered to the outer cylindrical surface of the inner support 3. Thus, the crystal 1 is effectively contained within and between the outer support 2 and the inner support 3. These three elements comprise the annular shear sensing element 110.

Referring to FIG. 2B, the outer crystal support 2 is slightly wider at the top to form a retaining lip 112 at its inner cylindrical surface. The inner crystal support 3 is slightly wider at the bottom to form a retaining lip 113 at its outer cylindrical surface. The crystal outer cylindrical surface 104 is slightly smaller than the inner cylindrical surface of the support 2, so that the retaining lip 112 can be positioned onto the crystal top surface 106. The crystal inner cylindrical surface 101 is slightly larger than the outer cylindrical surface of the support 3, so that the crystal bottom surface 108 can be positioned onto the retaining lip 113. So, a portion of the bottom surface 108 of the crystal 1 contacts the bottom lip 113, and a portion of the top surface 106 of the crystal 1 contacts the upper lip 112.

As shown in FIG. 2B, the inner crystal support 3 has a hole 103, designed in the center. The hole is shown slightly tapered and drilled through at a smaller diameter, but it can actually have any suitable size and shape, such as flat-bottomed or drilled through with a uniform diameter or not be there at all. In addition, because the crystal 1 has a smaller width than the supports 2, 3, a gap 105 is formed above the crystal top surface 106 and below the crystal bottom surface 108, in between the inner and outer support rings 3, 2.

Turning back to FIGS. 1, 3, the annular shear sensing element 110 is positioned between the inner support shoe 4 and the outer support shoe 5. As best shown in FIG. 1A, the inner support shoe 4 and the outer support shoe 5 are each formed as a solid semi-cylinder, with a semi-circular cross-section (about a half circle). The support shoes 4, 5 are separated from each other by gaps 107 such that together, the support shoes and the gaps form a cylinder. The gaps 107 between the inner support shoe 4 and the outer support shoe 5 are of sufficient size to separate the shoes, so that they do not touch, which would affect the pressure applied to the sensing element 110.

In the embodiment shown in FIG. 1B, the inner support shoe 4 is designed in such a way to provide a centering protruding cylindrical surface 102 that is received by the hole 103 and has a side that mate with the inner crystal support 3. Also, the inner support shoe 4 has to come in contact only with the inner crystal support 3, and not touch any other part of the annular shear sensing structure 110. A ring-shaped groove 132 is designed into the flat surface 130 of the inner support shoe 4 in such a way to provide a flat surface, 134, to contact only the inner crystal support bottom surface and create a gap around the outer crystal support 2. The inner crystal support bottom surface is epoxied to the flat surface 134 of the inner support shoe 4.

In addition, the outer support shoe 5 contacts only the outer crystal support 2, and not touch any other part of the annular shear sensing structure 110. A flat counter bore is designed into the flat surface 140 of the outer support shoe 5 in such a way to provide a flat surface 146 to contact the outer crystal support top surface. Another smaller diameter counter bore 144 is design into the flat surface 146, creating a gap 109 so that the outer support shoe 5 does not touch the inner crystal support 3. The outer crystal support top surface is epoxied to the flat surface 146 of the outer support shoe 5.

Accordingly, the outer crystal support 2 contacts the outer support shoe 5, but does not contact the inner support shoe 4. And the inner crystal support 3 contacts the inner support shoe 4, but does not contact the outer support shoe 5. That configuration allows the shoes 4, 5 to transmit pressure to the piezoelectric crystal 1.

Referring to FIG. 3, the electrical isolator 6 has a tubular shape with an inner cylindrical surface 156 that forms an open end 152 and, at the other end, steps inward to a smaller diameter inner cylindrical surface, 154, forming a lip 158 and a smaller opening 159. The opening 159 is provided to prevent stiffening of the case 7, which would reduce the pressure force applied to the inner and outer shoes, 4, 5.

Referring to FIG. 1A, the inner and outer support shoes 4, 5 holding the annular shear sensing element 110 in between is slid inside the electrical isolator 6, all the way in, until it contacts the lip 158. The electrical isolator 6 can have an inner diameter that is slightly larger than the outer diameter of the combined shoes 4, 5, and, in this case, the outer surfaces of the inner and outer support shoes are epoxied inside the isolator 6. The electrical isolator 6 can also have an inner diameter that is slightly smaller than the outer diameter of the combined shoes 4, 5, and, in this case, the inner and outer support shoes are press-fit inside the isolator 6.

Referring to FIG. 1A, the outer case 7 has a cup shape, i.e. a tube with an open end that forms the top and a closed end that forms the bottom. The isolator 6 with the support shoes 4, 5 and annular shear sensing element 110 assembled inside, is positioned approximately in the middle of the outer case 7. In other words, the isolator 6 does not extend to the bottom of the case 7, but rather creates a gap 113. The bottom of the case 7 makes the case too stiff to deform radially under pressure, so the electrical isolator 6 must be centered between the top and the bottom of the case. The inner diameter of outer case 7 can be slightly larger than the outer diameter of the electrical isolator 6, and in this case the outer surface of the isolator is epoxied inside the case. The inner diameter of outer case 7 can also be slightly smaller than the outer diameter of the electrical isolator 6, and in this case the outer surface of the isolator must be press-fit inside the case.

Referring to FIG. 3, the header 8 is comprised of a metal disc 172 and three feedthroughs $174_1$, $174_2$, and $174_3$. Two of the feedthroughs $174_1$, $174_2$ are glass sealed and so electrically isolated from the metal disc 172. The third feedthrough $174_3$ is electrically connected to the metal disc 172, and this can be achieved by welding or brazing techniques.

Referring to FIG. 1A, the header 8 is attached to the outer case 7, while feedthroughs $174_1$, $174_2$ are inserted inside the holes 141 and 131, respectively, and machined into the support shoes 5 and 4, respectively. The feedthroughs $174_1$, $174_2$ are connected electrically to the inner and outer support shoes 4, 5 by conductive epoxy 9. The holes 131 and 141 are deeper than the penetration length of the feedthroughs to create gaps at the bottoms of the holes and to allow for some flexing of the header when the unit is under static pressure. Accordingly, the gaps prevent the feedthroughs from hitting the bottom of the holes and stressing the glass seals (the epoxy 9 is flexible). The outer case 7 is filled with an inert gas and the three pin header 8 is welded to the outer case 7 to hermetically seal the hydrophone. Once welded, the outer case 7 and the metal base 172 of the three pin header are connected electrically and become the electrical shield for the hydrophone 100, which can be accessed by feedthrough $174_3$.

Figure 9:
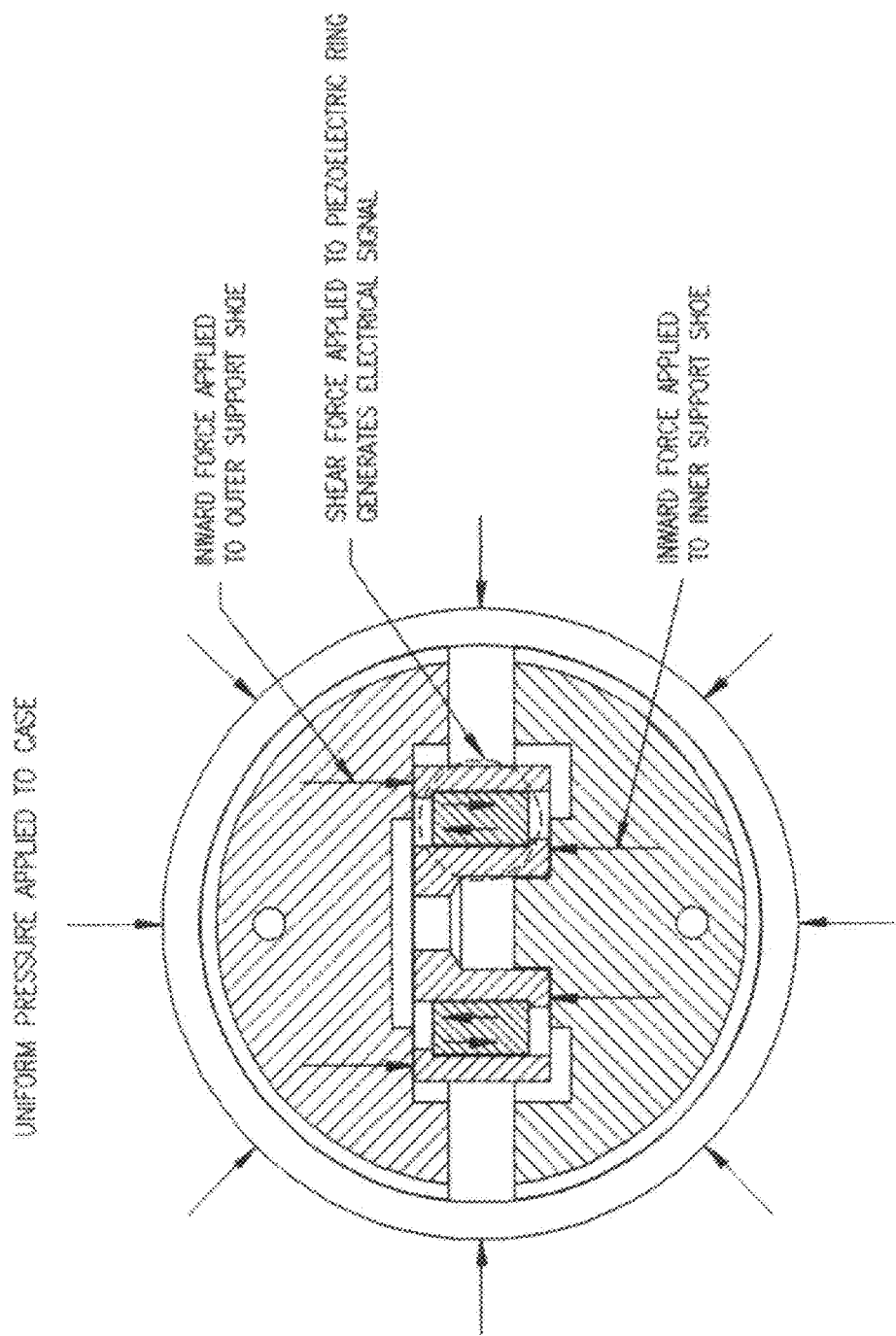
FIG. 9 is a cross sectional view showing applied pressure.

Referring to FIG. 9, in operation the shoes 4, 5 transmit the pressure applied to the case 7 to the sensing element 110. More specifically, the pressure on the shoes 4, 5 forces them inward, toward each other. In other words, when the acoustic pressure impinges on the hydrophone outer case 7, it compresses or squeezes the case 7 uniformly in all directions as long as the wavelength of the sound is large compared to the dimensions of the hydrophone. This causes the inner crystal support 4 to move in an opposing direction to the outer crystal support 5, thereby creating a net shear force on the crystal 1. Since the crystal is poled to be sensitive in the shear mode the shear force results in an electrical output.

Referring to FIG. 1B, more particularly in response to the pressure, the shoes 4, 5 push on the respective inner and outer crystal supports 3, 2. The inner support shoe 4 applies an inward (upward in the embodiments shown) force to the inner crystal support 3, via the ledge 134. The inner crystal support 3 can move upward and enter the gap 109 of the deeper bore 144, if necessary, without coming into contact with the outer support shoe 5, which would otherwise stop movement of the inner crystal support 3 and affect the pressure measurement. The outer support shoe 5 applies an inward (downward in the embodiment shown) force to the outer crystal support 2 via the ledge 146. The outer crystal support 2 can move downward, into the channel 132 without coming into contact with the inner support shoe 4, which would otherwise stop movement of the outer crystal support 2 and affect the pressure measurement. Since the crystal supports 2, 3 are attached to the crystal 1, they transmit the force from the shoes 4, 5 to the crystal 1 in opposite directions, basically shearing the crystal.

Thus, the crystal 1 senses the annular shear force due to the pressure on the shoes 4, 5 and provides an electrical signal output. The electrical signal from the sensing element 110 passes through the shoes 4, 5 to the header feedthroughs $174_1$, $174_2$.

Figure 4C:
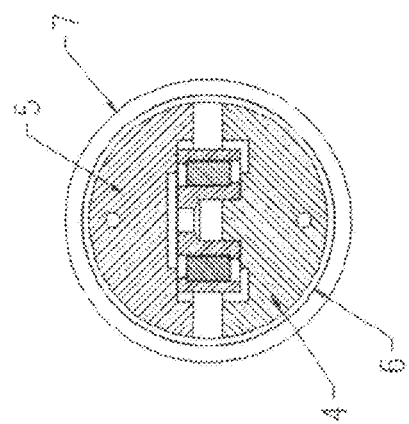
FIG. 4C is a cross-sectional end view of the hydrophone of FIG. 4B.
Figure 4B:
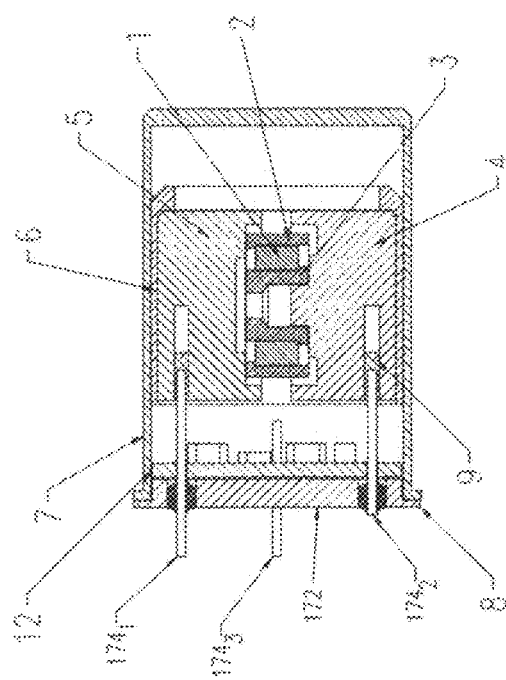
FIG. 4B is a cross-sectional side view of a radial hydrophone with an amplifier.
Figure 4A:
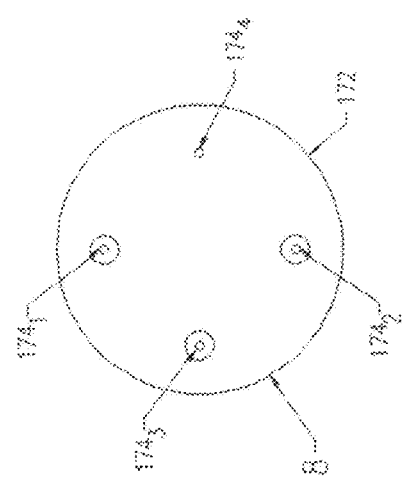
FIG. 4A is a top view of a radial hydrophone with an amplifier.

FIG. 4 shows an embodiment of the radial hydrophone 100 with an embedded amplifier. In this configuration, the header 8 is comprised of a metal disc 172 and four feedthroughs $174_1$, $174_2$, $174_3$ and $174_4$. The first, second and third feedthroughs $174_1$, $174_2$, $174_3$ are glass sealed and so electrically isolated from the metal disc 172. The fourth feedthrough $174_4$ is electrically connected to the metal disc 172, and this can be achieved by welding or brazing techniques. The second feedthrough $174_2$ is flush with the external side of the header. The third feedthrough $174_3$ is trimmed shorter so it does not touch the inner and outer support shoes 4, 5. The fourth feedthrough $174_4$ is flush with the internal side of the header. The amplifier 12 is an electrical circuit that is epoxied on the internal side of the header. The feedthroughs $174_1$, $174_2$ and $174_3$ penetrate the amplifier and are soldered to it. Feedthroughs $174_1$ and $174_2$ extend to the outer and inner support shoes 5, 4, where they are epoxied inside provided holes 141 and 131, similar to the embodiment shown in FIG. 1A.

This way, the first feedthrough $174_1$ is connected to both the amplifier 12 and the outer shoe 5 and serves as Signal (−) and Power (−). The second feedthrough $174_2$ is connected to both the amplifier 12 and the inner shoe 4 and serves as Signal IN (+). The third feedthrough $174_3$ is connected to the amplifier 12 only and serves to power the amplifier, as Signal OUT (+) and Power (+). The fourth feedthrough $174_4$ is connected to the header 8 only and serves as Ground.

Referring to FIG. 4, the amplifier 12 used in this embodiment, has the advantage of not having signal degradation as a result of excessive cable capacitance. The electrical signal is generated on the inner and outer cylindrical surfaces of the crystal and is transmitted through the crystal supports 2, 3 to the support shoes 4, 5, which further transmit the signal through the conductive epoxy 9 to the feedthroughs $174_1$, $174_2$ and to the amplifier 12.

FIG. 5 shows an embodiment of the radial hydrophone 100 with a pressure switch. In this embodiment the metal outer case 7 has an inward indention located at the end of the case. The indentation can have one or more steps that can make it move inward and outward in response to pressure. A static pressure of a specific magnitude will cause the indention to make contact with both the inner support shoe 4 and the outer support shoe 5, thereby creating an electrical short between the two sides of the annular shear sensing ring. This short will disable the hydrophone such that it will not produce an electrical signal in response to an acoustic pressure wave. When the pressure is relieved by a decrease in water depth, the indentation/diaphragm retracts and the short circuit condition is reversed. The purpose of this feature is to allow the export of the hydrophones by disabling the hydrophone below depths of 30 meters. It has a relatively thin material (metal in this case) that has been formed with ridges and valleys to allow flexing without permanent deformation.

Accordingly, the indentation operates as a switch that activates at a specific static pressure, or water depth, to short the electrical output of the hydrophone. The mechanical switch is an optional added component. The radial hydrophone 100 has the capability to provide a depth limiting feature using existing hydrophone components. In some towed array applications, a vessel may come to a stop and the towed array may sink far below the depth for which the pressure switch is designed. Some prior art pressure switches could be stressed to the point of deforming and may not return to their original position once the hydrophone rises above the design depth of the pressure switch. The radial hydrophone 100 utilizes the inner and outer support shoe as a mechanical stop that prevents the indented portion of the outer case from depressing to the point of deformation or fatigue. Again, the radial hydrophone 100 is utilizing existing components to create a pressure switch and its features.

Figure 6C:
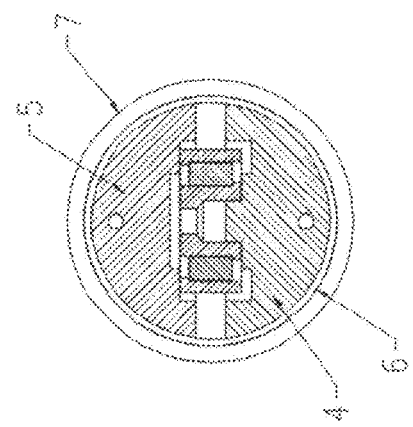
FIG. 6C is a cross-sectional end view of the hydrophone of FIG. 6B.
Figure 6B:
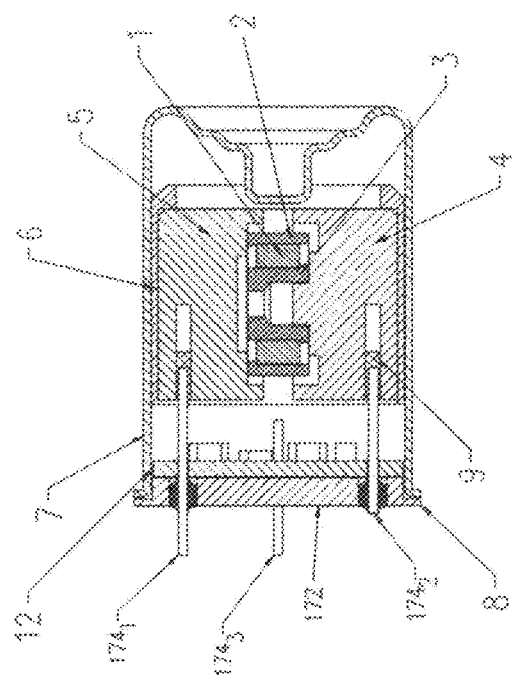
FIG. 6B is a cross-sectional side view of a radial hydrophone with a pressure switch and an amplifier.
Figure 6A:
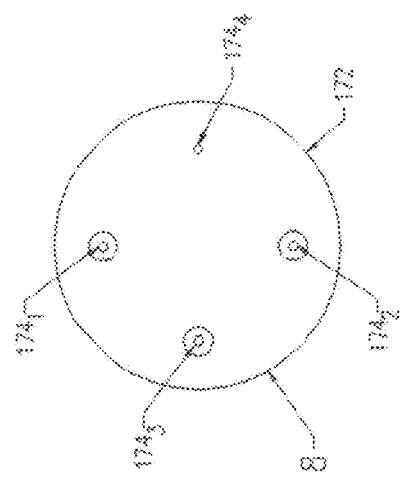
FIG. 6A is a top view of a radial hydrophone with a pressure switch and an amplifier.

FIG. 6 shows an embodiment of the radial hydrophone 100 with an embedded amplifier and a pressure switch. This embodiment represents a combination of the embodiment of FIG. 4 and embodiment of FIG. 5, which were described above.

Figure 7A:
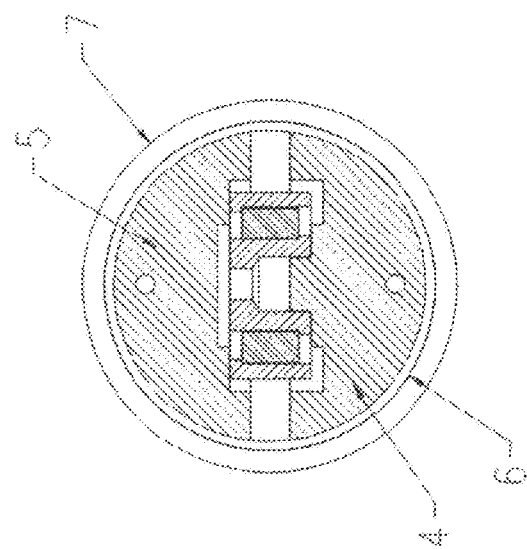
FIG. 7A is a cross-sectional side view of a radial hydrophone with an elongated support shoe.
Figure 7B:
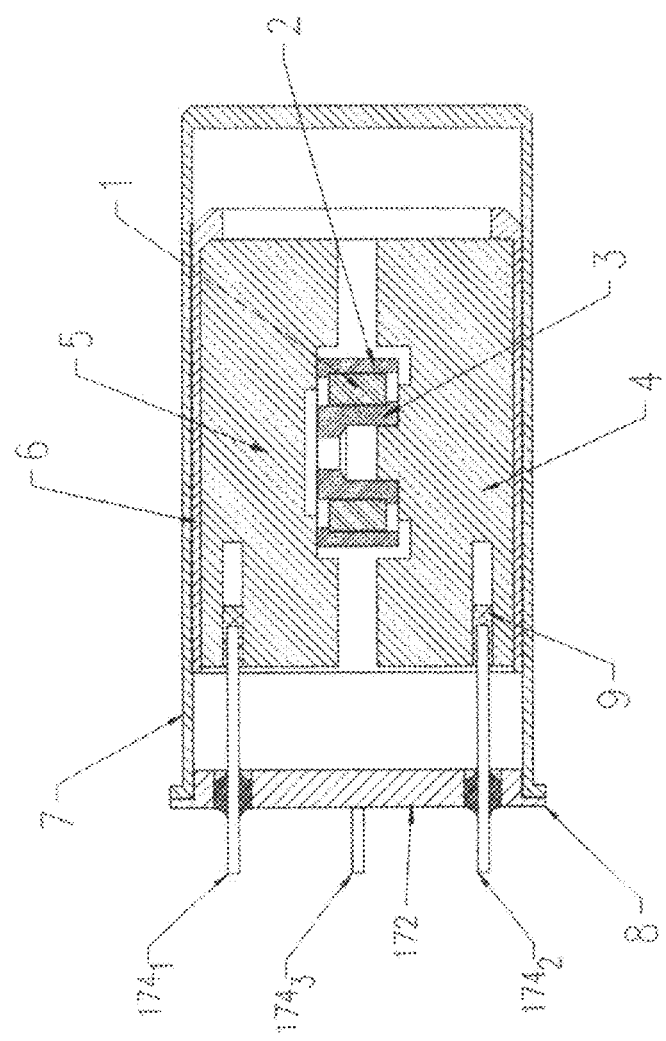
FIG. 7B is a cross-sectional end view of the hydrophone of FIG. 7A.

FIG. 7 shows an embodiment of the radial hydrophone 100 with longer inner support shoe 4 and outer support shoe 5. The longer support shoe provides a larger area for the acoustic pressure to impinge upon thereby increasing the force applied to the inner crystal support 3 and the outer crystal support 2. The increased force on the crystal support components increases the shear force on the piezoelectric crystal ring thereby creating a greater electrical output. This approach can be used if more output is needed but the radius of the hydrophone is constrained. The support shoe can be substantially longer than in prior embodiments, such as up to 100% longer or more, with the diameter being the same. An increase in the diameter while keeping the length the same would also increase the output sensitivity (more sensitive).

FIG. 8 shows an embodiment of the radial hydrophone 100 with an elliptical inner support shoe 4 and outer support shoe 5. The elliptical support shoe provides a larger surface area for the acoustic pressure to impinge upon thereby increasing the force applied to the inner crystal support 3 and the outer crystal support 2. The increased force on the crystal support components increases the shear force on the piezoelectric crystal ring thereby creating a greater electrical output. This approach can be used if more output is needed but the length of the hydrophone is constrained. One skilled in the art will recognize that other suitable shapes can be provided for the shoes 4, 5, within the spirit and scope of the invention.

One advantage of the invention is that the radial hydrophone 100 is created out of common accelerometer sensing elements. That is, the annular shear crystal is currently utilized in accelerometers and that by utilizing the inherent insensitivity (lack of electrical output) of the crystal to transverse forces and balancing the mass loads (support shoes) bearing on the crystal in the sensitive axis 90 (FIG. 1A), which is transverse (perpendicular to the longitudinal axis of the case 7), a low acceleration sensitivity hydrophone can be realized. This is achieved by connecting the outer case to the piezoelectric crystal via the outer and inner support shoes and the inner and outer crystal supports. The sensitivity of the hydrophone is proportional to the surface area of the housing and the support shoes combined with the inherent sensitivity of the piezoelectric element. Therefore, using the same piezoelectric element, one could increase the sensitivity of the hydrophone by changing the surface area of the support shoes, either in the axial or radial direction, and the outer case that is exposed to the acoustic pressure. With this approach a single annular shear sensing element can be mass produced and utilized in many different hydrophone configurations, all of which had the same capacitance but different acoustic pressure sensitivities.

Currently, low acceleration sensitivity hydrophones are created by combining two equal but opposing piezoelectric elements to cancel the acceleration induced electrical signals created from each element. As stated previously, this approach is tedious and time consuming and results in a very labor intensive and expensive hydrophone. The radial hydrophone 100 uses only one piezoelectric element poled in the shear mode to construct a low acceleration sensitive hydrophone. No cancellation of opposing signals is required.

Referring to FIG. 1A, when the hydrophone 100 is accelerated it moves as a rigid body rather than being squeezed. Therefore if the hydrophone 100 is accelerated along the sensing element 110 axis 90 (FIG. 1A), the most sensitive direction of the hydrophone, the inner and outer crystal supports will move in the same direction. To insure that there are no shear forces acting on the crystal, the net inertial forces acting on the masses of the inner and outer crystal supports and the other components attached to the crystal have to be zero. To avoid a net inertial force, the masses of the hydrophone components must be equal on both sides of the crystal. If the masses are equal then a force on both will result in a net inertial force of zero which translates into a net shear force of zero on the crystal and no electrical signal will be generated by the crystal. That is, by equalizing the inertial mass on either side of the shear sensing structure, there is no inertial force exerted on the sensing structure when the sensor is subjected to acceleration (as the masses on either side move in tandem). Accordingly, acceleration along the sensing element axis 90 will not result in an electrical output.

If the hydrophone were accelerated in any other direction but the sensing element axis 90, the hydrophone would also move as a rigid body. In this case, the acceleration component perpendicular on the sensing element axis 90 would be zero because of the inherent insensitivity of the shear poled crystal. The acceleration component in the sensing element axis direction would cancel as described in the above paragraph. With this hydrophone embodiment, low acceleration sensitivity is about −50 dB re 1 v/g or better.

Accordingly, the pressure sensor of the present invention is able to reduce or eliminate output due to acceleration of the sensor. An output only occurs when a pressure is applied to the case's outer diameter, in the present case of the radial embodiment.

The piezoelectric element used for the crystal 1 in the present invention can be made of any piezoelectric material as long as it is poled in the shear mode. Some common piezoelectric materials include PZT and single crystal materials such as PMN-PT. The inherent sensitivity of the annular shear sensing element will be dependent upon the piezoelectric properties of the individual materials.

The radial hydrophone 100 is both hermetically sealed and electrically shielded by virtue of the welded outer case 7 and the header 8. This avoids the need for an electrical shield or shield cloth and avoids water seeping into the case 7. The header and outer case can be made of stainless steel or any other metal that provides and electrical shield and is resistant to corrosion when exposed to sea water. The stiffness of the case affects the sensitivity of the device, reducing the output sensitivity, and must be taken into account when designing for specific output sensitivity.

The hermetically sealed design of the radial hydrophone 100 does not need a pressure compensation feature to operate at great ocean depths. The stiffness of the design protects the hydrophone from being crushed at all depths commonly used with underwater towed arrays, stationary arrays, and other sensing systems both mobile and stationary. The nature of the design also prevents it from generating a voltage due to an unbalanced force on the hydrophone provides a stable acoustic pressure response at all depths. This is achieved by balancing the masses that bear on both sides of the piezoelectric crystal ring.

The radial hydrophone 100 is designed such that it can use a standard accelerometer sensing element to create a hydrophone. The standard accelerometer element is currently manufactured in large volumes so the manufacturing techniques and materials are well understood. The simple construction of the radial hydrophone combined with the standard parts allows the hydrophone to be manufactured at a low cost.

Axial Hydrophone (FIGS. 10-13)

Figure 10B:
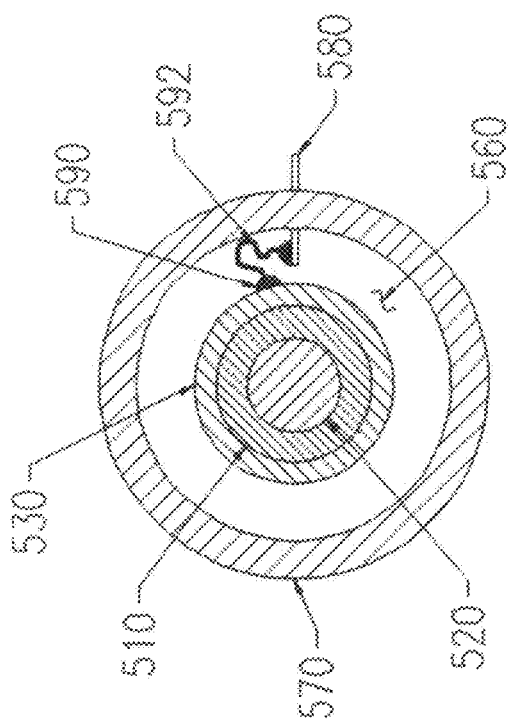
FIG. 10B is a cross-sectional top view of the axial hydrophone of FIG. 10A.
Figure 10A:
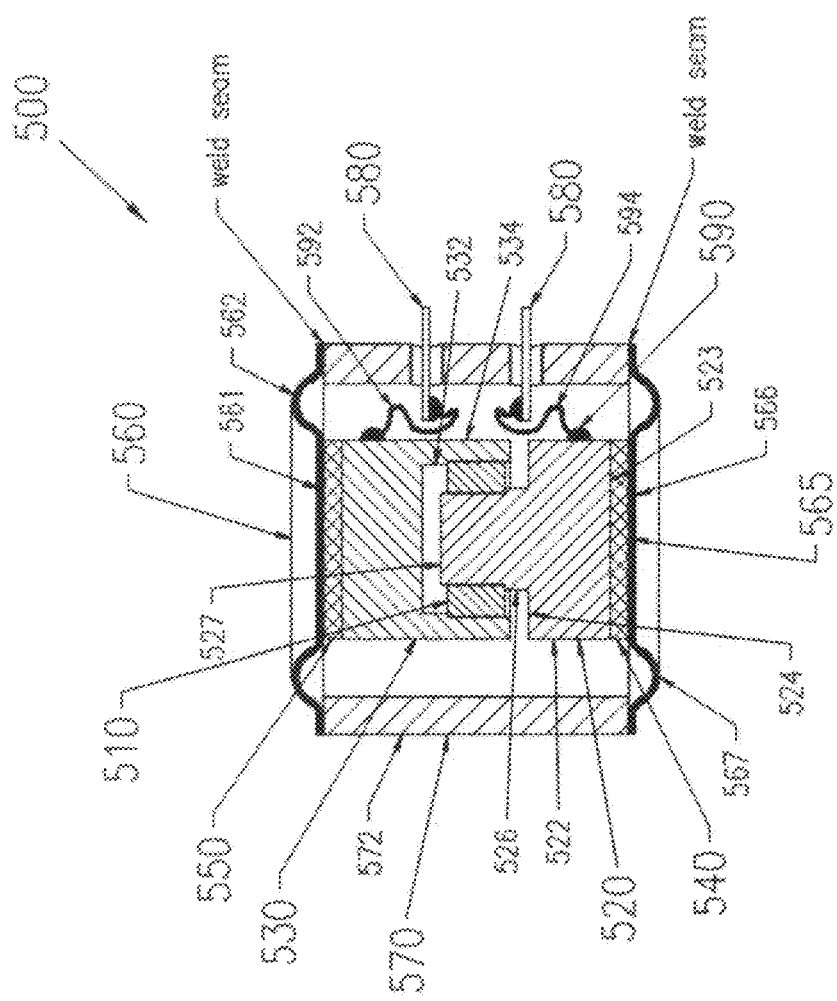
FIG. 10A is a cross-sectional side view of an axial hydrophone with annular shear crystal in accordance with another embodiment of the invention.

FIG. 10 show the embodiment of a hermetically sealed, axial hydrophone 500 with an annual shear crystal. Referring to FIG. 10A, the hydrophone 500 includes a piezoelectric crystal 510, an inner crystal support 520, an outer crystal support 530, an inner support isolator 540, an outer support isolator 550, two diaphragms 560, 565, an outer case 570 with two glass sealed feedthroughs 580 for electric output, two electrical contacts (soldered, spot welded) 590, a hook-up wire (positive signal (+)) 592, and a hook-up wire (negative signal (−)) 594.

The axial hydrophone 500 has an annular piezoelectric crystal ring 510 that is polarized in the shear mode. The inner and outer cylindrical surfaces of the shear mode crystals 510 are plated (metalized), providing output electrodes. When the shear crystal is deformed by an external excitation (pressure in our case), shear stresses may be internally generated leading to an electrical output (electrical charge) built on its electrodes. The crystal 510 becomes a charged capacitor (one of the electrodes carrying negative charge and the other a positive charge).

The inner support 520 has a cylindrical bottom portion 522 and a small diameter cylindrical top portion 526. The cylindrical bottom portion 522 has a flat bottom surface 523, a flat top surface 524. The cylindrical top portion 526 has a flat top surface 527. The top portion 526 can be integral with the base portion 522, and projects upward (in the embodiment shown) from the center of the top surface 524 of the base portion 522. The inner cylindrical surface of the crystal 510 is glued with conductive epoxy or soldered to the cylindrical surface 526 of the inner crystal support 520, leaving a gap between the bottom flat surface of the crystal and the flat surface 524 of the inner support. In other words, the crystal is not resting onto the flat surface 524, but rather is positioned away from it, creating a gap.

The outer support 530 is a cylindrical part with an outer diameter 534 that has a central bore of inner diameter 532. The outer cylindrical surface of the crystal 510 is glued with conductive epoxy or soldered to the center bore cylindrical surface 532 of the outer support 530, leaving a gap between the top flat surface of the crystal and the bottom of the center bore. In other words, the crystal is not resting on the bottom of the center bore, but rather away from it, creating a gap. At the same time, the top flat surface 527 of the inner support 520 is also not touching the bottom surface of the outer support center bore, but rather away from it, creating a gap. Thus, no surface of the inner crystal support 520 comes into contact with any surface of the outer crystal support 530, so that the inner crystal support 520 and outer crystal support 530 can move freely without contacting each other.

The inner support 520 transmits the pressure excitation exerted on the bottom of the unit (acting up in FIG. 13A) to the inner cylindrical surface of the crystal 510. The outer support 530 transmits the pressure excitation exerted on the top of the unit (acting down in FIG. 13A) to the outer cylindrical surface of the crystal 510. These opposite excitations on the inner and outer cylindrical surfaces of the crystal 510 shear it, thus, producing an electrical signal − negative electrical charges on one crystal cylindrical surface and positive electrical charges on the other crystal cylindrical surface. When the inner and outer supports 520, 530 are electrically connected (soldered or glued with conductive epoxy) to the crystal cylindrical surfaces, they operate as the "electrodes", further carrying the electrical signal towards an exit (the pins 580 in the case 570).

The inner support isolator 540 and the outer support isolator 550 are each a flat disc. The bottom surface 523 of the inner crystal support 520 is epoxied or otherwise adhered or connected to a top surface of the inner support electrical isolator 540. The top surface of the outer crystal support 530 is epoxied or otherwise adhered or connected to the bottom surface of the outer support electrical isolator 550.

The outer case 570 is tubular part with an outer cylindrical surface 572, top flat surface 574 and bottom flat surface 576. The outer case 570 encloses the crystal ring 510, inner support 520, outer support 530 and the isolators 540, 550. A first diaphragm 560 covers the outer case top surface 574 and a second diaphragm 565 covers the outer case bottom surface 576. Each of the diaphragms 560, 565 has a flat surface 561, 566 and a curved flex ridge 562, 567, respectively. The flex ridges 562, 567 are located at the outer circumference of the diaphragms 560, 565 allowing the flat surfaces 561, 566 to move up and down relative to the outer case 570.

The top surface of the bottom diaphragm 565 is epoxied to the bottom surface of the inner support isolator 540. The outer edge of the diaphragm 565 contacts the bottom surface of the case 570. The bottom surface of the top diaphragm 560 is epoxied to the top surface of the outer support isolator 550. The outer edge of the diaphragm 560 contacts the top surface of the case 570. The outer case 570 is filled with an inert gas and the diaphragms 560, 565 are pressed onto the outer case and welded so as to hermetically seal the case. The welded case also provides an electrical shield for the hydrophone. Accordingly, the diaphragms 560, 565 and the outer case 570 fully enclose the crystal ring 510, inner support 520, outer support 530 and the isolators 540, 550.

The inner and outer supports 520, 530 and their isolators 540, 550 are significantly smaller in diameter than the inner diameter of the outer case and centered within the outer case. The inner and outer supports 520, 530 and their isolators 540, 550 are attached to the outer case 570 with flexible diaphragms 560, 565. Thus, the outer case 570 is relatively rigid when compared to the flexible diaphragms and allow the inner and outer supports 520, 530 to move freely up and down. Under external pressure, the inner and outer supports 520, 530 move toward each other and shear the crystal 510. The diaphragms 560, 565 are shaped to be as flexible as possible but still withstand a certain pressure rating (to impede/limit the external pressure as little as possible). Basically, the flexibility of the diaphragms 560, 565 "decouple" the inner and outer supports 520, 530 acting on the crystal 510 from the rigid case (the case stays still while parts 510, 520, 530, 540, 550 are squeezed).

In operation, the flex ridges 562, 567 allow the flat surfaces 561, 566 of the diaphragms 565, 560, respectively, to move up and down in response to the pressure on the hydrophone 500. The flat surfaces 561, 566, in turn, move the isolators 550, 540, and outer/inner crystal supports 530, 520, respectively. The outer crystal support 530 provides a downward force at the outer surface of the crystal 510, and the inner crystal support 520 provides an opposite upward force at the inner surface of the crystal 510. The crystal 510 measures the axial forces applied by the outer and inner crystal supports 530, 520. The inner and outer supports 520, 530 are electrically connected to crystal surfaces and the isolators 540, 550 electrically isolate the supports 520, 530 from the case 570. If these isolators 540, 550 are not used, the crystal 510 can be electrically shorted.

A first electrical contact 590 is soldered or spot welded to the inner crystal support 520 and a second electrical contact 590 is soldered or spot welded to the outer crystal support 530.

The tubular metal outer case 570 has two glass sealed feedthroughs 580 pressed into it. The case encloses the crystal-supports-isolators (510, 520, 530, 540, 550) assembly. A positive signal wire 592 is soldered between one of the feedthroughs 580 and the outer crystal support 530. A negative signal wire 594 is soldered between the other feedthrough and the inner crystal support 520. Accordingly, the electrical signal from the crystal 510 can pass to the supports 520, 530, via the electric contacts 590 and wires 592, 594 to the pins 580. The pins 580 pass the signals to the outside of the hydrophone 500.

FIG. 11 show another embodiment of the axial hydrophone 500. Referring to FIG. 11B, the hydrophone $500_1$ is similar to the hydrophone 500 of FIG. 10, but now has two plane piezoelectric crystal plates $510_1$, $510_2$ that are polarized in the shear mode. In addition, the top cylindrical surface 526 of the inner crystal support 520 has two flat surfaces $521_1$, $521_2$. The outer crystal support 530 is a cylinder with two protrusions that have parallel, inner, flat surfaces $536_1$, $536_2$. Accordingly, the inner surface of the crystal plates $510_1$, $510_2$ are glued with conductive epoxy or soldered to outer flat surfaces $521_1$, $521_2$ on opposite sides of the inner crystal support 520. The outer surface of the crystal plates $510_1$, $510_2$ are glued with conductive epoxy or soldered to inner flat surfaces $536_1$, $536_2$ of the outer crystal support 530. The other components of FIG. 11 are the same as described with respect to FIG. 10, and the description above is incorporated here. The shear crystals plates $510_1$, $510_2$ are easier to make and less expensive than cylindrical shear crystals. This embodiment may be more suitable for certain applications, depending on design considerations such as generated output, size, and cost.

Figure 12B:
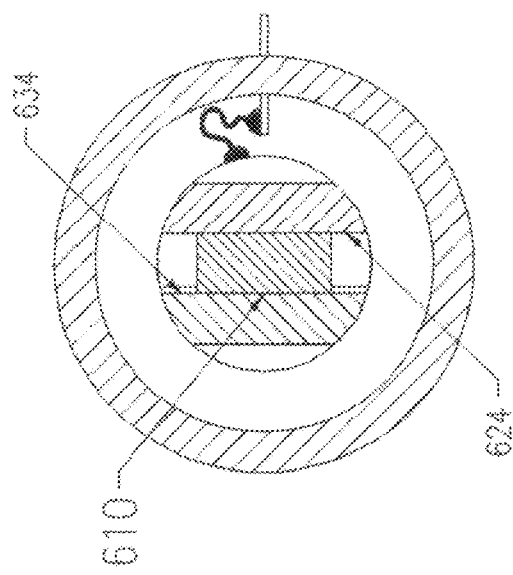
FIG. 12B is a cross-sectional top view of the axial hydrophone of FIG. 12A.
Figure 12A:
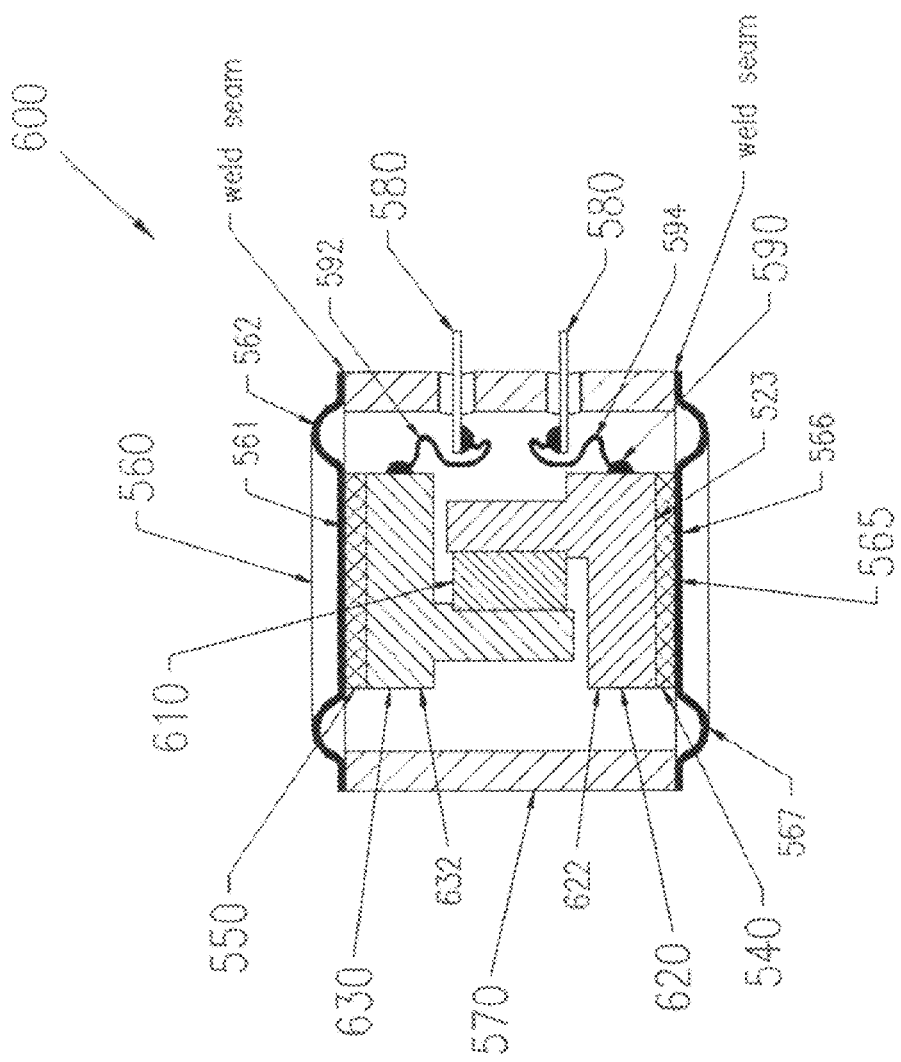
FIG. 12A is a cross-sectional side view of an axial hydrophone with center plane shear crystal.

FIGS. 12A, 12B show another embodiment of the axial hydrophone 600. The hydrophone 600 has a single plane piezoelectric crystal plate 610 that is polarized in the shear mode. Here, the lower crystal support 620 and the upper crystal support 630 have similar shape as each other. The lower crystal support 620 has a bottom cylindrical portion 622 which extends upward with a protruding portion that has a flat surface 624. The upper crystal support 630 has a top cylindrical portion 632 which extends downward with a protruding portion that has a flat surface 634. The lower and upper crystal supports 620, 630, are positioned such that the flat surfaces 624, 634 are parallel and oppose each other. The piezoelectric crystal plate 610 is sandwiched between the two flat surfaces 624, 634 and is glued with conductive epoxy or soldered to a flat surface 624 of the lower crystal support 620 and also glued with conductive epoxy or soldered to the flat surface 634 of the upper crystal support 630. The top surface of crystal 610 does not touch the upper crystal support 630, but rather is spaced away from it. The bottom surface of crystal 610 does not touch the lower crystal support 620, but rather is spaced away from it. At the same time, the upper and the lower crystals supports 630, 620 do not touch each other. The other components of FIG. 12 are the same as described with respect to FIG. 10, and the description above is incorporated here.

Thus, FIG. 12 are another embodiment of the invention to create a shear mode hydrophone by having pressure squeeze two opposite diaphragms and shear a piezoelectric crystal, generating electrical output. It uses only one plate crystal. This embodiment may be more suitable for certain applications based on design considerations such as generated output, size, and cost.

Referring to FIG. 13, the axial hydrophones 500, $500_1$ and 600 of the present invention (FIGS. 10-12) mechanically connect the diaphragms to the piezoelectric crystal via inner and outer isolators and the inner and outer crystal supports. Pressure is transmitted from the diaphragms to the isolators to the inner and outer supports and to the crystal. All these parts need to be rigidly connected to each other (epoxied, soldered) to transmit the pressure effectively (with little losses). Any gaps in the contact surfaces between these parts generate pressure loss, diminishing the electrical output. The sensitivity of the hydrophone is proportional to the surface area of the diaphragms and the support shoes combined with the inherent sensitivity of the piezoelectric crystal. Therefore, using the same piezoelectric element, one could increase the sensitivity of the hydrophone by changing the surface area of the support shoes and the diaphragms that are exposed to the acoustic pressure. With this approach one could mass produce a single shear sensing element and utilize it in many different hydrophone configurations, all of which had the same capacitance but different acoustic pressure sensitivities. Thus, the acoustic pressure sensitivity of a single piezoelectric sensing element can be increased by modifying a separate mechanical component, without having to add components or adjust wiring schemes. For example, to double the pressure sensitivity of the hydrophone while keeping the capacitance the same, one could increase the area of the diaphragms by a factor of two. This method is much simpler and requires only one electrical connection.

Figure 13A:
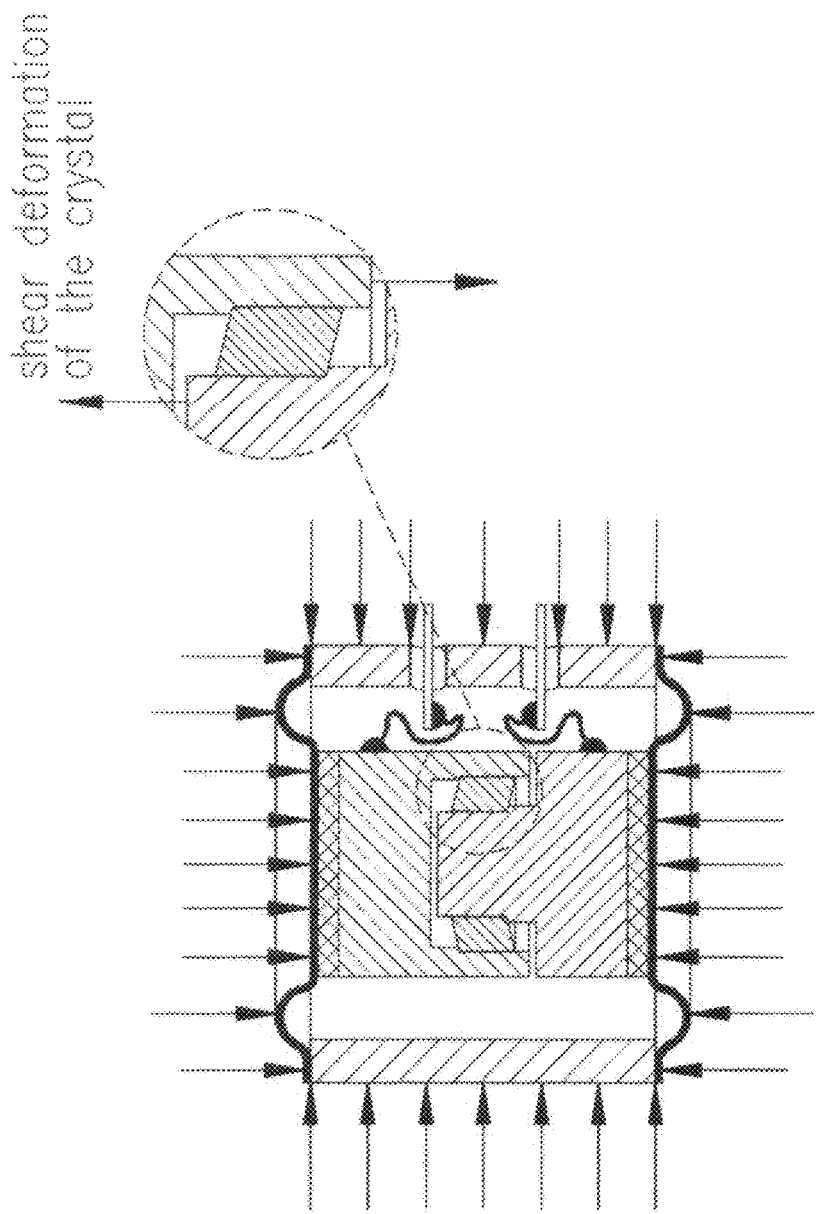
FIG. 13A shows the axial hydrophone with external pressure excitation.

FIG. 13A illustrates the effect of pressure on the crystal. When an acoustic pressure impinges on the hydrophone, it compresses or squeezes the case uniformly in all directions as long as the wavelength of the sound is large compared to the dimensions of the hydrophone. The cylindrical part of the case is rigid but the diaphragms will move with the acoustic wave which causes the inner crystal support to move in an opposing direction to the outer crystal support thereby creating a net shear force on the crystal. As illustrated, the outer side wall surface 104 is pushed down by the outer support 2, and the inner side wall surface 101 is pushed upward by the inner support. Comparing FIGS. 10A and 13A, it is noted that during external pressure excitation (FIG. 13A), the outer crystal support 530 moves closer to (but does not touch) the inner crystal support 520. This distorts the crystal from a rectangular cross-section (FIG. 10A) to a parallelogram cross-section (FIG. 13A). Since the crystal is polarized to be sensitive in the shear mode, the shear force results in an electrical output.

Referring to FIG. 13B, when the axial hydrophone is accelerated it moves as a rigid body rather than being squeezed. Therefore if the hydrophone were accelerated in the in the axial direction 700 (the sensitive direction of the hydrophone) the diaphragms and the inner and outer crystal supports would move in the same direction as each other. This would create no net shear force on the crystal and would result in no electrical signal being produced.

In addition the shear polarization of the crystal makes the sensor inherently insensitive to any other direction than the polarization direction. For instance, if the axial hydrophone is accelerated along the axial direction 700, the most sensitive direction of the hydrophone, the inner and outer crystal supports will move in the same direction. To insure that there are no shear forces acting on the crystal, the net inertial forces acting on the masses of the inner and outer crystal supports and the other components attached to the crystal have to be zero. To avoid a net inertial force, the masses of the hydrophone components must be equal on both sides of the crystal. If the masses are equal, then a force on both will result in a net inertial force of zero which translates into a net shear force of zero on the crystal and no electrical signal will be generated by the crystal. Therefore, acceleration along the sensing element axis will not result in an electrical output.

If the hydrophone were accelerated in any other direction but the axial direction 700, the hydrophone would also move as a rigid body. In this case, the acceleration component perpendicular on the axial direction 700 would be zero because of the inherent insensitivity of the shear poled crystal. The acceleration component in the sensing element axis direction would cancel as described in the prior paragraph. With this hydrophone embodiment, low acceleration sensitivity is about −50 dB re 1V/g or better.

Accordingly, the pressure sensor of the present invention is able to reduce or eliminate output due to acceleration of the sensor. An output only occurs when a pressure is applied to the ends' diaphragms, in the present case of the axial embodiment.

The axial hydrophone uses only one piezoelectric element polarized in the shear mode to construct a low acceleration sensitive hydrophone. No cancellation of opposing signals is required. The only requirement is that the crystal be mass balanced in the axial (sensitive) direction so that when the hydrophone moves as a rigid body during acceleration the net inertial force on the masses, which translates into a net shear force on the crystal, is zero. In other words, for designs presented in FIGS. 10-12, the inertial mass (the weight) of the crystal support 520, 620 and its adjacent isolator 540 needs to be equal to the inertial mass (the weight) of the crystal support 530, 630 and its adjacent isolator 550.

The piezoelectric element used in the figures can be made of any piezoelectric material as long as it is poled in the shear mode along the axial direction. Some common piezoelectric materials include PZT and single crystal materials such as PMN-PT. The inherent sensitivity of the annular shear sensing element will depend upon the piezoelectric properties of the individual materials.

The axial hydrophone is both hermetically sealed and electrically shielded by virtue of the welded outer case and the diaphragms. The diaphragms and outer case can be made of stainless steel or any other metal that provides and electrical shield and is resistant to corrosion when exposed to sea water.

The axial hydrophone does not need a pressure compensation feature to operate at great ocean depths. The stiffness of the design protects the hydrophone from being crushed at all depths commonly used with underwater towed arrays, stationary arrays, and other sensing systems both mobile and stationary.

Conclusion (FIGS. 1-13)

It is noted that various elements of the hydrophones are described as being connected to each other using adhesives and solder. Those connections are intended to fixedly attach those elements to one another to form rigid, reliable and permanent attachments. One skilled in the art will recognize that other suitable fixed attachments may be appropriate other than adhesives and solder, such as fasteners, or integrally forming the elements as one piece. Thus, the specific connections are not intended to be limiting on the invention.

The description uses several geometric or relational terms, such as cylindrical, rounded, tapered, stepped, parallel, perpendicular, concentric, and flat. In addition, the description uses several directional or positioning terms and the like, such as top, bottom, left, right, up, down, inner, and outer. Those terms are merely for convenience to facilitate the description based on the embodiments shown in the figures. Those terms are not intended to limit the invention. Thus, it should be recognized that the invention can be described in other ways without those geometric, relational, directional or positioning terms. In addition, the geometric or relational terms may not be exact. For instance, walls may not be exactly perpendicular or parallel to one another but still be considered to be substantially perpendicular or parallel because of, for example, roughness of surfaces, tolerances allowed in manufacturing, etc. And, other suitable geometries and relationships can be provided without departing from the spirit and scope of the invention.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A hydrophone comprising:
a case having a first side and a second side opposite the first side;
a sensor having a first side and a second side, the first side forming an inner surface of the sensor and the second side forming an outer surface of the sensor;
an inner support affixed to the first side of the case and affixed to the inner surface of the sensor, wherein said inner support moves freely in a first direction in response to pressure on the case to exert a first force on said sensor;
an outer support affixed to the second side of the case and affixed to the outer surface of the sensor, wherein said outer support moves freely in a second direction opposite the first direction in response to pressure on the case to exert a second force on said sensor, wherein said sensor generates a signal in response to the first and second forces.

2. The hydrophone of claim 1, further comprising an inner electrical isolator affixed between the case and the inner support, and an outer electrical isolator affixed between the case and the outer support.

3. The hydrophone of claim 1, further comprising a first diaphragm formed at the first side of the case, and a second diaphragm formed at the second side of the case, and wherein the inner support is affixed to the first diaphragm and the outer support is affixed to the second diaphragm.

4. The hydrophone of claim 1, wherein the inner support does not contact the outer support.

5. The hydrophone of claim 1, wherein said sensor comprises a single plane piezoelectric crystal plate poled in the shear mode in the axial direction.

6. The hydrophone of claim 1, wherein said sensor comprises two plane piezoelectric crystal plates poled in the shear mode in the axial direction, each crystal plate having an inner surface and an outer surface, and wherein the inner support is affixed to the inner surface of each of the two crystal plates and the outer support is affixed to outer surface of each of the two crystal plates.

* * * * *